(12) United States Patent
Michalak

(10) Patent No.: US 9,211,827 B2
(45) Date of Patent: Dec. 15, 2015

(54) SEAT CUSHION STRUCTURE

(75) Inventor: Eric B. Michalak, Northville, MI (US)

(73) Assignee: Johnson Controls Technology Company, Holland, MI (US)

( * ) Notice: Subject to any disclaimer, the term of this patent is extended or adjusted under 35 U.S.C. 154(b) by 233 days.

(21) Appl. No.: 13/509,658

(22) PCT Filed: Nov. 16, 2010

(86) PCT No.: PCT/US2010/056863
§ 371 (c)(1),
(2), (4) Date: Aug. 20, 2012

(87) PCT Pub. No.: WO2011/060428
PCT Pub. Date: May 19, 2011

(65) Prior Publication Data
US 2012/0313409 A1    Dec. 13, 2012

Related U.S. Application Data

(60) Provisional application No. 61/261,507, filed on Nov. 16, 2009.

(51) Int. Cl.
*B62J 1/26* (2006.01)
*B60N 2/70* (2006.01)
*B60N 2/56* (2006.01)

(52) U.S. Cl.
CPC ............. *B60N 2/7064* (2013.01); *B60N 2/56* (2013.01); *B60N 2/7035* (2013.01); *B60N 2/7047* (2013.01); *B60N 2/7094* (2013.01)

(58) Field of Classification Search
CPC ... B60N 2/7094; B60N 2/7047; B60N 2/7035
USPC .............. 297/219.1, 188.01, 223, 452.21, 297/452.35, 224, 452.48, 452.49, 452.54, 297/200, 284.1, 452.5; 5/716, 720
See application file for complete search history.

(56) References Cited

U.S. PATENT DOCUMENTS

| | | | |
|---|---|---|---|
| 1,955,583 A * | 4/1934 | Haffey | 5/720 |
| 2,012,042 A * | 8/1935 | Gerlofson et al. | 267/145 |
| 2,042,238 A * | 5/1936 | Otto | 297/309 |
| 2,048,126 A * | 7/1936 | Kuhner | 297/452.5 |
| 2,672,923 A * | 3/1954 | McCormick | 297/452.5 |

(Continued)

FOREIGN PATENT DOCUMENTS

| | | |
|---|---|---|
| JP | 2000-072069 | 3/2000 |
| JP | 2000-168419 | 6/2000 |

(Continued)

OTHER PUBLICATIONS

Translation of "Notice of Reasons for Rejection", (Office Action), date of delivery: Jan. 7, 2014.

(Continued)

*Primary Examiner* — Chi Q Nguyen
(74) *Attorney, Agent, or Firm* — Butzel Long

(57) ABSTRACT

A seat cushion structure for use in a vehicle seat including a first outer wall and a second outer wall joined to form a plurality of chambers. The seat cushion includes an energy absorption substance disposed within the chambers to absorb occupant load. The seat cushion also includes a plurality of springs disposed within the chambers to further facilitate occupant support and comfort.

10 Claims, 17 Drawing Sheets

(56) References Cited

U.S. PATENT DOCUMENTS

| | | | |
|---|---|---|---|
| 2,855,984 A * | 10/1958 | Majorana et al. | 297/378.1 |
| 3,171,691 A * | 3/1965 | Buehrig | 297/452.54 |
| 3,204,016 A * | 8/1965 | Sanger et al. | 264/46.7 |
| 3,280,410 A * | 10/1966 | Propst et al. | 267/119 |
| 3,506,308 A * | 4/1970 | Fenton | 297/452.47 |
| 3,792,501 A * | 2/1974 | Kery | 5/12.1 |
| 5,002,331 A * | 3/1991 | Frye et al. | 296/146.4 |
| 5,002,336 A * | 3/1991 | Feher | 297/180.13 |
| 5,004,294 A * | 4/1991 | Lin | 297/180.11 |
| 5,135,282 A * | 8/1992 | Pappers | 297/284.3 |
| 5,176,424 A * | 1/1993 | Tobita et al. | 297/284.1 |
| 5,419,612 A * | 5/1995 | Rassekhi | 297/200 |
| 5,444,881 A * | 8/1995 | Landi et al. | 5/708 |
| 5,558,398 A * | 9/1996 | Santos | 297/284.3 |
| 5,590,428 A * | 1/1997 | Roter | 5/726 |
| 5,617,595 A * | 4/1997 | Landi et al. | 5/653 |
| 5,845,352 A * | 12/1998 | Matsler et al. | 5/654 |
| 5,918,696 A * | 7/1999 | VanVoorhies | 180/273 |
| 6,206,474 B1 | 3/2001 | Kruse et al. | |
| 6,212,719 B1 * | 4/2001 | Thomas et al. | 5/713 |
| 6,357,830 B1 * | 3/2002 | Ratza et al. | 297/452.52 |
| 6,431,651 B1 * | 8/2002 | Lee | 297/397 |
| 6,626,494 B2 | 9/2003 | Yoo | 297/296 |
| 6,687,933 B2 * | 2/2004 | Habboub et al. | 5/654 |
| 2003/0019040 A1 | 1/2003 | Rowley et al. | |
| 2005/0269848 A1 | 12/2005 | Harley | |
| 2007/0022538 A1 * | 2/2007 | Zschoch | 5/655.8 |

FOREIGN PATENT DOCUMENTS

| | | |
|---|---|---|
| JP | 2006158410 A | 6/2006 |
| JP | 2007-216811 A | 8/2007 |
| JP | 2008-265746 | 11/2008 |
| JP | 2009-504296 | 2/2009 |
| WO | WO-2007/077699 A1 | 7/2007 |

OTHER PUBLICATIONS

Patent Abstract of Japan Publication No. 2000-168419, date of publication of application: Jun. 20, 2000.
Patent Abstract of Japan Publication No. 2008-265746, date of publication of application: Nov. 6, 2008.
Patent Abstract of Japan Publication No. 2000-072069, date of publication of application: Mar. 7, 2000.
Patent Abstract of Japan Publication No. 2009-504296, date of International publication: Feb. 22, 2007 (WO 2007/020526).
Patent Abstract of Japan Publication No. 2007-216811, date of publication of application: Aug. 30, 2007, 1 page.
Patent Abstract of Japan Publication No. 2006-158410, date of publication of application: Jun. 22, 2006, 1 page.

* cited by examiner

SEAT CUSHION STRUCTURE

CROSS REFERENCE TO RELATED APPLICATIONS

This application claims the benefit of and priority to U.S. Provisional Application No. 61/261,507, filed Nov. 16, 2009, which is incorporated herein by reference.

BACKGROUND

The present disclosure relates generally to the field of seats and more particularly, to a seat cushion structure for use in a seat, such as a vehicle seat.

DESCRIPTION OF THE RELATED ART

Conventional vehicle seats are typically constructed from a sub-frame and a cushion coupled thereto to provide comfort, isolation from the road induced vibrations not isolated by the vehicle suspension system, and protection for the seat occupant. Known seat cushions come in a variety of designs and are made from a variety of materials. For example, it is known to provide a seat assembly having a suspension mat strung across the sub-frame with a foam cushion located on the suspension mat. Known seat cushion structures can be ineffective in providing comfort and protection. Known seat cushion structures can have complicated designs that hinder manufacturing and assembly. Moreover, known seat cushion structures can be relatively bulky, massive, and expensive.

Accordingly, there remains a continuing need to provide an improved seat cushion structure design.

SUMMARY

Accordingly, the present disclosure relates to a seat cushion structure for use in a vehicle seat including a first outer wall and a second outer wall joined to form a plurality of chambers. The seat cushion includes an energy absorption substance disposed within the chambers to absorb occupant load. A plurality of springs is disposed within the chambers to further facilitate occupant support and comfort.

Also provided is a seat cushion structure for use in a vehicle seat including a first outer wall and a second outer wall joined to form a plurality of chambers. The seat cushion includes an energy absorption substance disposed within the chambers to absorb occupant load. A plurality of springs is disposed within the chambers to further facilitate occupant support and comfort. The seat cushion structure also includes a support substrate attached to the second outer wall to provide additional support.

Also provided is a seat cushion structure including a cushion member having a first side, a second opposed side, a front side 517, an opposed rear side 519, an upper surface 521 having a raised portion at the first and second side bolsters 515, 515'; and an opposed lower surface 522. A first set of springs is disposed within the cushion member first side, such that the first set of springs is arranged in a row from the cushion member front side to the cushion member rear side. A second set of springs is disposed within the cushion member second side, such that the second set of springs is arranged in a row from the cushion member front side to the cushion member rear side. The first and second set of springs serve to straddle and support cargo and occupants.

An advantage of the present disclosure is that the seat cushion structure provides enhanced comfort. Another advantage of the present disclosure is that the seat cushion structure is more cost effective. A further advantage of the present disclosure is that the seat cushion is relatively lightweight.

Other features and advantages of the present disclosure will be readily appreciated, as the same becomes better understood after reading the subsequent description taken in conjunction with the accompanying drawings.

DESCRIPTION

Figure 1:
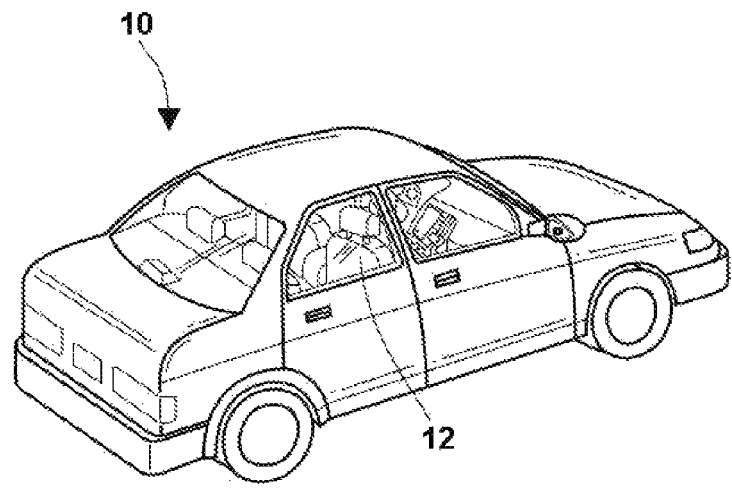
FIG. 1 is a perspective view of a vehicle, according to an exemplary embodiment.

Referring generally to the FIGURES and particularly to FIG. 1, a vehicle 10 is shown according to an exemplary embodiment. The vehicle 10 can include one or more seat assemblies 12 provided for occupant(s) of the vehicle 10. While the vehicle 10 shown is a four door sedan, it should be understood that the seat assembly 12 may be used in a minivan, sport utility vehicle, airplane, boat, or any other type of vehicle.

Figure 2:
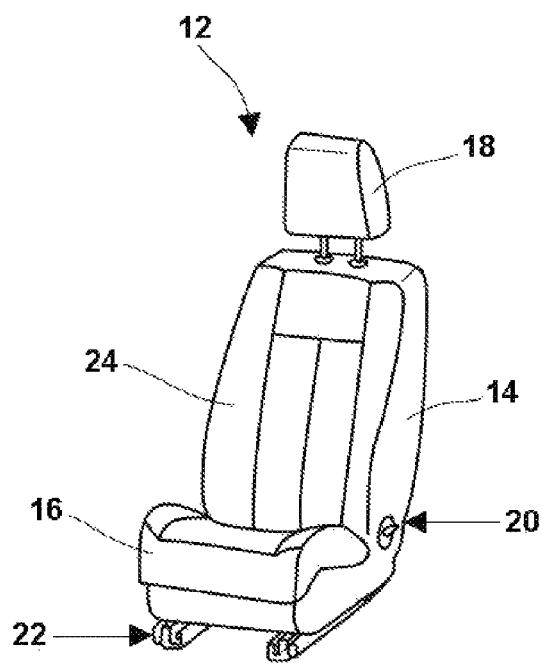
FIG. 2 is a perspective view of a vehicle seat assembly, according to an exemplary embodiment.

Referring now to FIG. 2, a seat assembly 12 is shown. The seat assembly 12 includes a seat frame 13 having a seat back 14 and a seat base 16. The seat back 14 provides comfort, support and protection to the seated occupant. The seat base 16 is operatively connected to the seat back 14, and likewise provides comfort, support and protection to the seated occupant. A head restraint 18 is positioned at an upper end of the seat back 14 and also provides comfort, support and protection to the seated occupant. The seat assembly 12 can also include a recliner mechanism 20 operatively connected to the seat back 14 and seat base 16, to provide rotatable adjustability of the seat back 14 with respect to the seat base 16. The seat assembly 12 can be secured to the vehicle 10 using a track assembly 22. The track assembly 22 of this example enables the seat assembly to be repositioned relative the vehicle floor to enhance comfort and utility. The seat back 14 and seat base 16 can also include other components, such as, a trim cover 24, or the like. The seat assembly 12 also includes a seat cushion structure 26.

Figure 3:
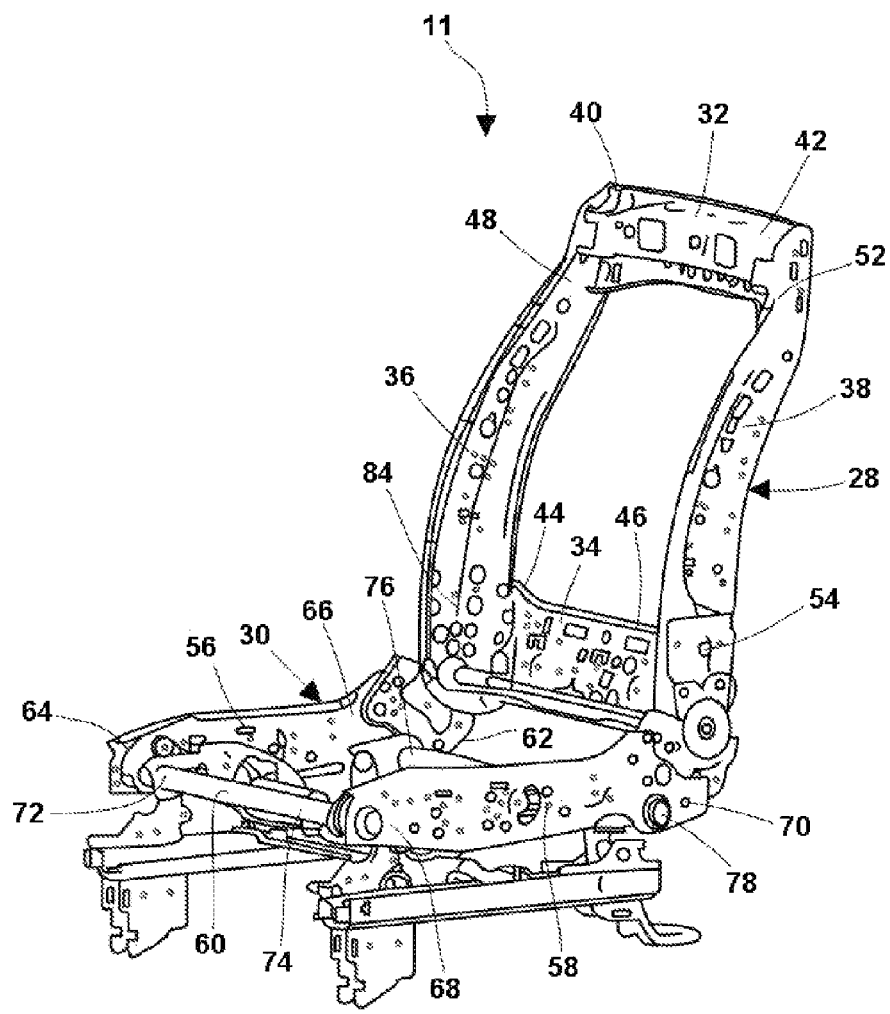
FIG. 3 is a perspective view of a vehicle seat frame, according to an exemplary embodiment.
Figure 4:
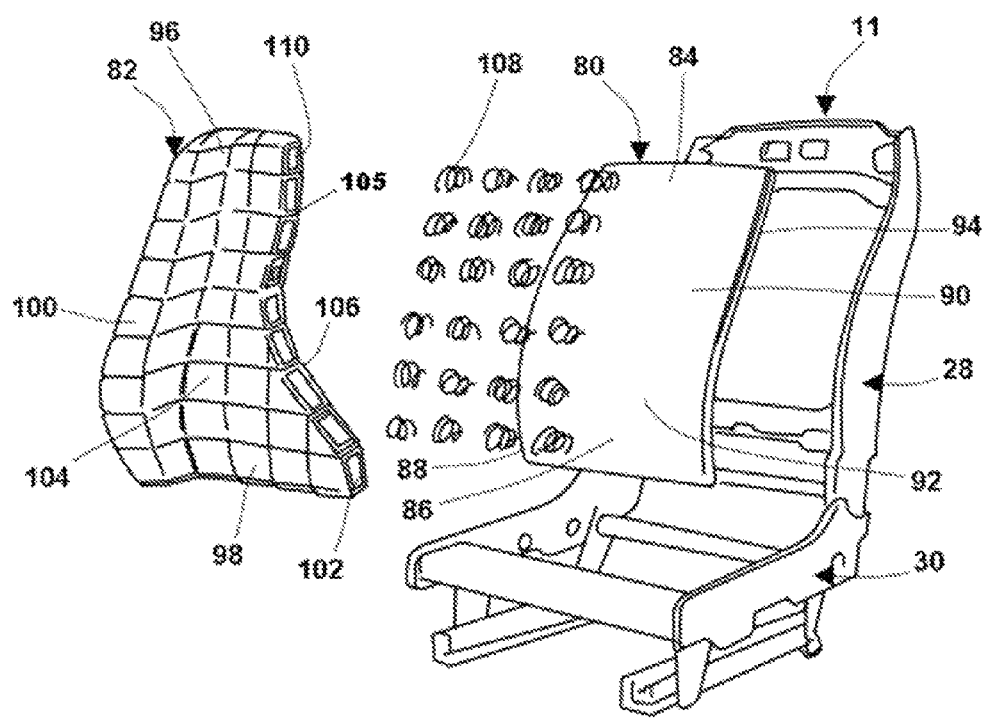
FIG. 4 is an exploded view of a vehicle seat frame assembly having a seat cushion structure, according to an exemplary embodiment.
Figure 5:
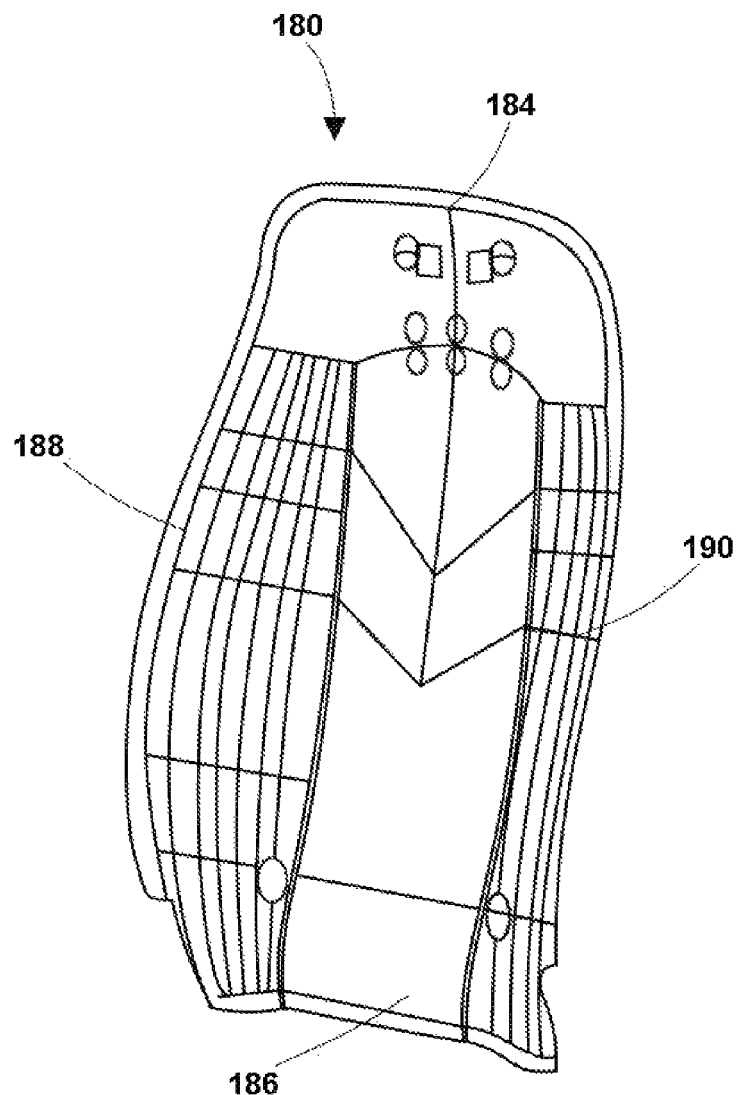
FIG. 5 is a front perspective view of a structural support substrate, according to another embodiment.
Figure 6:
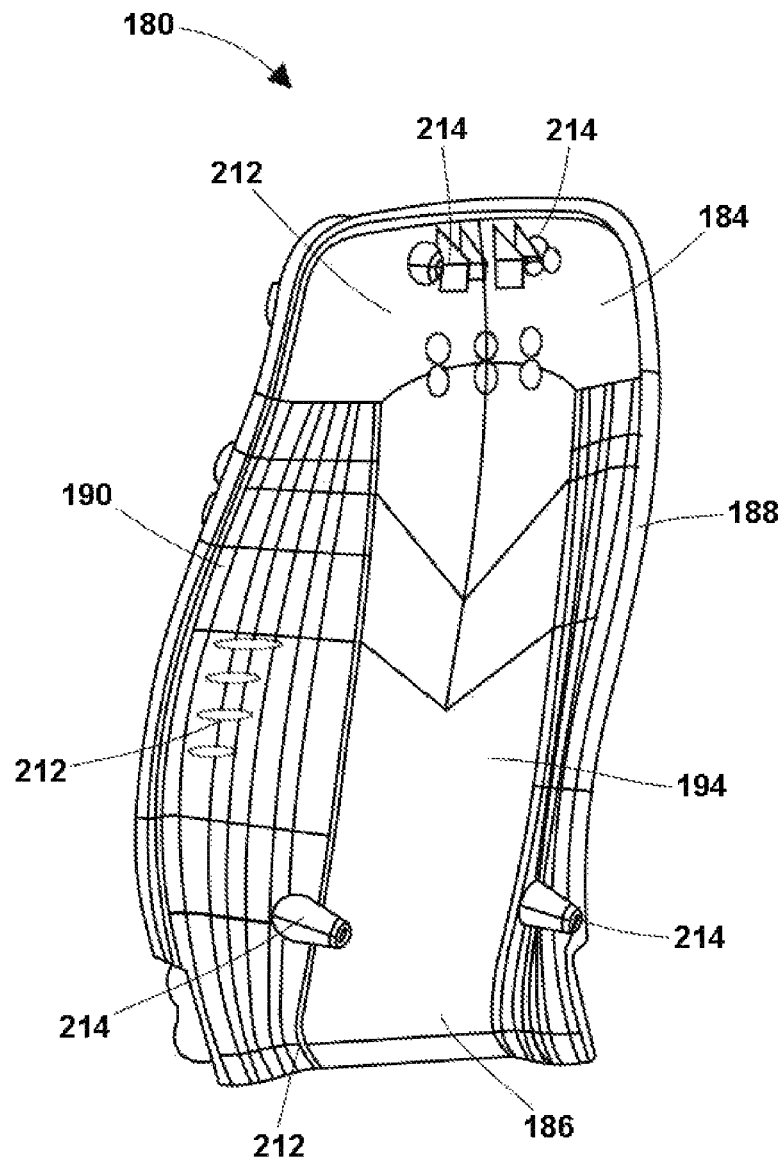
FIG. 6 is a rear perspective view of the structural support substrate of FIG. 5.
Figure 7:
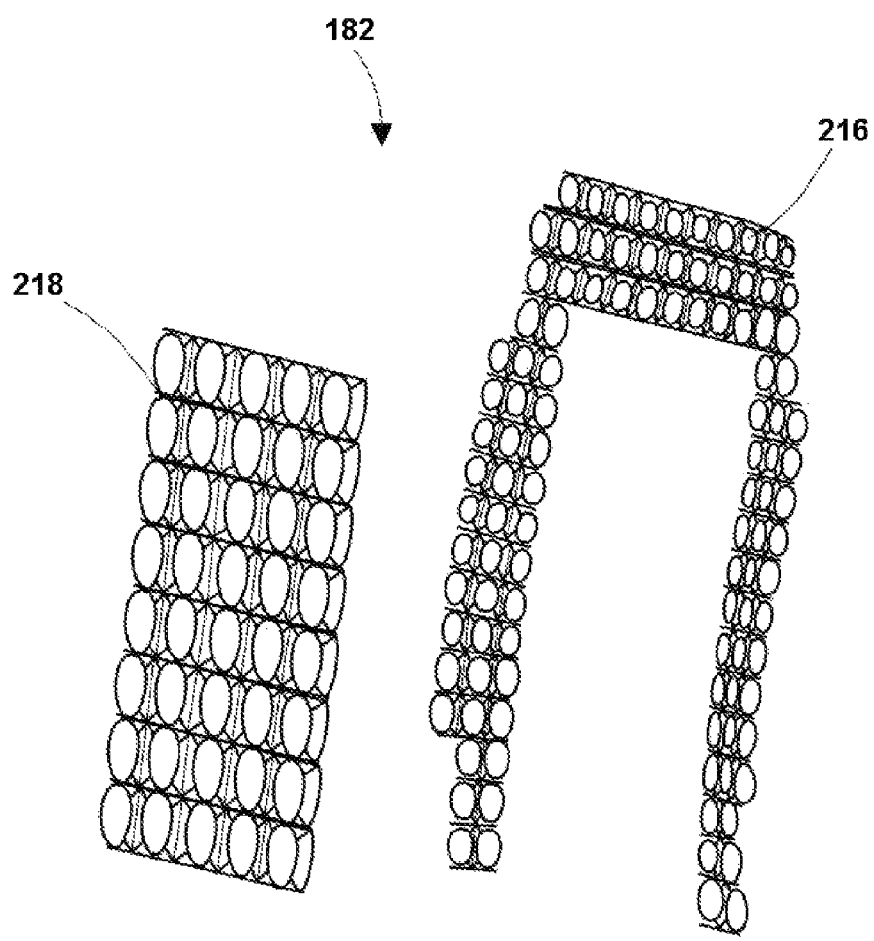
FIG. 7 is an exploded perspective view of a cushion member, according to another embodiment.
Figure 8:
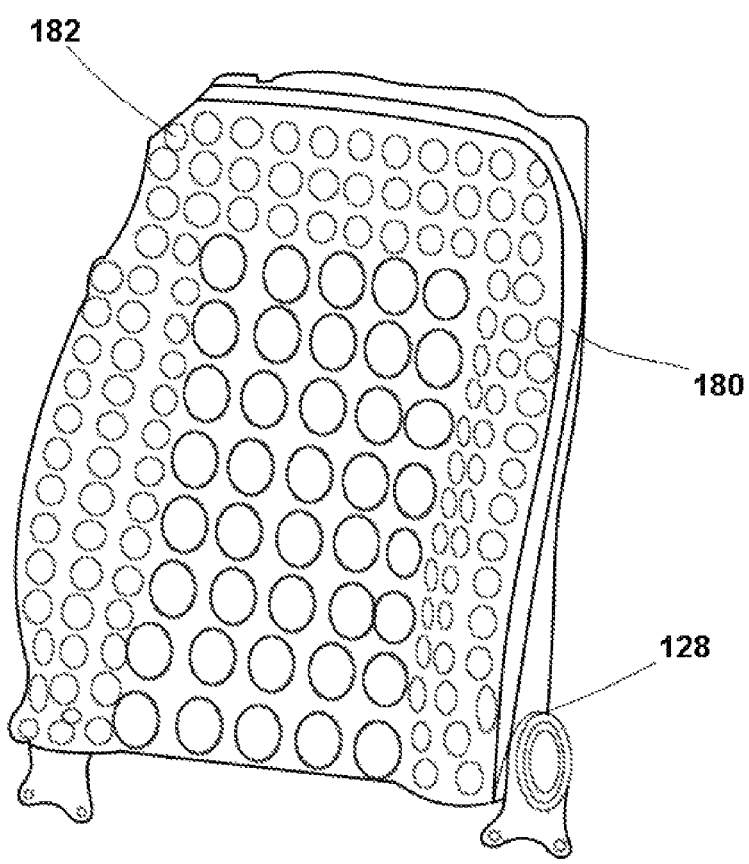
FIG. 8 is a perspective view of the structural support structure of FIG. 5 and the cushion member of FIG. 7 coupled to a seat back frame.

Referring next to FIG. 3, a seat frame 13 having a seat back cushion structure 26 is shown. The seat frame 13 includes a seat back frame 28 and a seat base frame 30.

The seat frame 13 includes a seat back frame 28, and a seat base frame 30. The seat back frame 28 includes an upper cross member 32, an opposed lower cross member 34, a first seat back side member 36, and an opposed second seat back side member 38. The upper cross member 32 includes a first and a second end 40, 42 and the lower cross member 34 includes a first and second end 44, 46. The first seat back side member 36 includes an upper end 48 and an opposed lower end 50 and the second seat back side member 38 includes an upper end 52 and an opposed lower end 54. The upper ends of the first and second seat back side members 48, 52 are coupled together by the upper cross member 32 and the lower ends of the first and second seat back side members 50, 54 are coupled together by the lower cross member 34 such that a substantially rectangular frame structure is formed. The seat base frame 30 includes a first seat base side member 56, an opposed second seat base side member 58, a front cross member 60, and an opposed rear cross member 62. The first seat base side member 56 includes a front end 64 and a rear end 66 and the second seat base side member 58 includes a front end 68 and an opposed rear end 70. The front cross member 60 includes a first end 72 and a second end 74, and the rear cross member 62 includes a first end 76 and a second end 78. The front ends of the first and second seat base side member 64, 68 are coupled together by the front cross member 60 and the rear ends of the first and second seat base side member 66, 70 are coupled together by the rear cross tube member 30 such that a substantially rectangular frame structure is formed. It should be noted that other seat frame designs can be used with the present disclosure, such as, a one-piece back frame or a one-piece seat base frame, or the like. The seat frame 13 can be made from a variety of materials, such as, metal, aluminum, composite material, or the like.

The seat cushion structure 26 includes a structural support substrate 80, and a cushion member 82. The structural support substrate 80 includes an upper end 84, an opposed lower end 86, a first side 88, and an opposed second side 90. The structural support substrate 80 also includes a front surface 92 and a rear surface 94. The structural support substrate 80 is overlaid and coupled to at least a portion of the seat frame 13, such as, the seat back frame 28, the seat base frame 30, or the like. In this example, the structural support substrate 80 is positioned over and coupled to the seat back frame 28 between the upper cross member 32, the lower cross member 34, and the first and second side members 36, 38. The structural support substrate 80 can be connected to the seat frame 13 such that is has a general contour shape reflective of the contour shape of the targeted occupant. The structural support substrate 80 can be coupled to the seat frame 13 in any known or appropriate manner, such as, fastened to the seat frame 13, draped and stretched over the seat frame 13, or the like. The structural support substrate 80 can be secured thereto using a variety of techniques, such as, fastening, bolting, welding, or the like, and coupling members, such as, a hog rings, hooks, clips, screws, wire loop, snaps, buttons, or the like. The structural support substrate 80 can be made from a variety of materials, such as, plastic, fabric, polymer, natural fiber, rubber, or the like, having sufficient strength to function as the structural support for an occupant. In this example, the structural support substrate is a plastic shell.

The cushion member 82 is generally a rectangular and planar member having an upper end 96, an opposed lower end 98, a first side 100, and an opposed second side 102. The cushion member 82 also includes a front outer wall 104 and an opposed rear outer wall 106 interconnected by a plurality of inner walls 105. The inner walls 105 are configured in a predetermined manner to define a plurality of chambers 110 between the inner walls 105 and the outer walls 104, 106. For example, the inner walls 105 may be arranged longitudinally and/or laterally and/or angularly to define chambers 110 having a particular shape, such as, cubed, or the like. The cushion member 82 can also include a plurality of compression members 108, such as, springs, or the like, distributed throughout the cushion member 82. For example, some or all of the chambers 110 may contain one or more coil springs, a spring within a spring, multi-layers of springs, or the like. The design is not limited to traditional coil springs and includes any known or future material or composite or assemblies that provide a similar 'kinematic' feature, such as, gel, water, plastic, shape changing material, or the like. The cushion member 82 is overlaid and coupled to at least a portion of the structural support substrate 80, and/or the seat frame 13, such as, the seat back frame 28, the seat base frame 30, or the like. The cushion member 82 can be connected to structural support substrate 80 and/or the seat frame 13 such that is has a general contour shape reflective of the contour shape of the targeted occupant. The cushion member 82 can be coupled to the seat frame 13 in any known or appropriate manner, such as, fastened to the seat frame 13, draped and stretched over the seat frame 13, or the like. The cushion member 82 can be secured thereto using a variety of techniques, such as, fastening, bolting, welding, or the like, and coupling members, such as, a hog rings, clips, screws, wire loop, snaps, buttons, or the like. The cushion member 82 can be made from a variety of materials, such as, plastic, fabric, polymer, natural fiber, rubber, propylene mesh, or the like, having sufficient strength and support to function as the cushion member 82 for an occupant. The cushion member 82 can also be encased in foam, attached to other components, such as, the trim cover 24, or the like, and/or a combination thereof.

In this example, the cushion member 82 provides subsystem spring 'kinematics' to the seat occupant and is placed on the structural support substrate 80 to overlay a substantial portion of the seat back frame 28. It is contemplated that the seat cushion structure 26 can be used in other areas of a seat, such as, the seat base, head restraint, side bolsters, or the like, and in other types of seat assemblies, such as, second row seats, seat benches, or the like. The cushion member 82 is a segmented fabric pouch containing a plurality springs 108 within pouches 110.

Referring now to FIGS. 5-8, another embodiment of a structural support substrate 180 and cushion member 182 is shown wherein like features are identified using like reference numbers. In this embodiment, the structural support substrate 180 has a contour corresponding to the seat back frame 28. The first and second sides 188, 190 are also contoured to correspond with the side bolsters of the vehicle seat assembly 12. The structural support substrate 180 can also include areas 212 for attaching energy absorbing members or features 214. The areas 212 are strategically located around the structural support substrate 180, such as, the upper end 184, lower end 186, sides 188, 190, front surface 192, rear surface 194, or the like. The energy absorbing members 212 can be in a variety of forms, such as, absorbing foam, springs, ribs, corrugations, tubular extensions, or the like, and are designed to absorb the energy from a collision impact and to reduce the impact to the seat occupant. The energy absorbing members 212 absorb energy by, changing their shape in a predetermined manner as they absorb the energy, such as, folding, collapsing, crushing, compressing, or the like. For example, the energy absorbing members 212 can be designed to fold in an accordion like manner as the absorb energy from an impact collision. In this embodiment, the cushion member 182 has a multi-piece construction having an outer portion 216 and an inner portion 218. The outer portion 216 is generally a rectangular frame that encircles the inner portion 218 that is generally rectangular and planar in shape. The outer portion 216 is generally overlaid the individual members of the seat back frame 128 whereas the inner portion 218 is generally overlaid the area spanning between the upper end, the lower end, first side and second side of the seat back frame 128.

Figure 9:
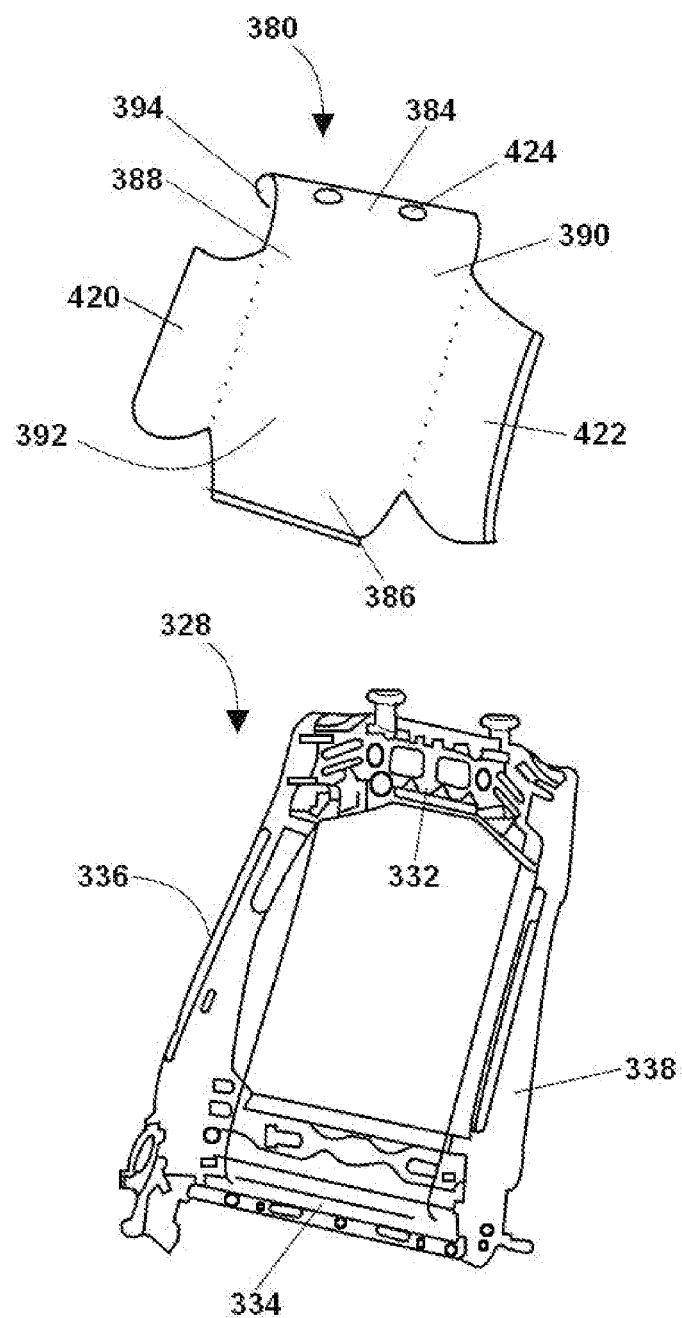
FIG. 9 is a perspective view of a structural support structure and seat back frame, according to still another embodiment.
Figure 10:
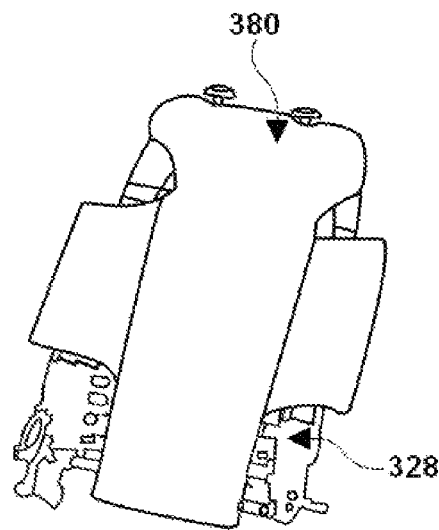
FIG. 10 is a perspective view of the structural support structure of FIG. 9 partially attached to the seat back frame.
Figure 11:
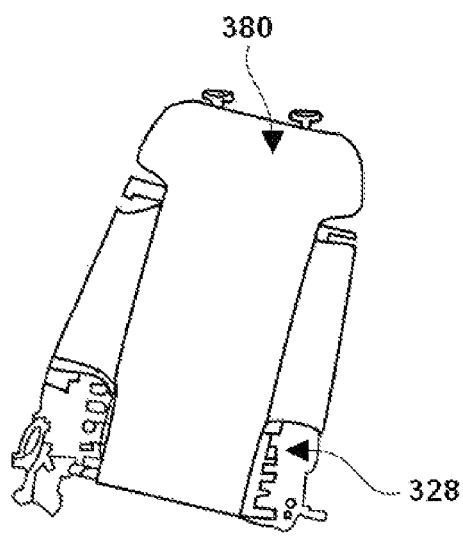
FIG. 11 is a perspective view of the structural support structure of FIG. 9 completely attached to the seat back frame.

Referring next to FIGS. 9-11, a structural support substrate 380 and seat back frame 328 according to still another embodiment is shown. In this embodiment, the structural support substrate 380 is generally a rectangular and planar member having an upper end 384, an opposed lower end 386, a first side 388, an opposed second side 390, a front surface 392, and a rear surface 394. The structural support substrate 380 also includes a first and second extension 420, 422, such as, a flap, wing, or the like, that extend from the first and second side 388, 390, respectively. Although two extensions or flaps 420, 422 are shown, any number of extensions or flaps can be used. The main body portion of the structural support substrate 380 that is placed on the seat back frame 328, such as, by positioning it on, over, around, adjacent, the seat back frame 328, as shown in FIG. 10. The structural support substrate 380 can also have a sock-type construction that can be slipped over or onto the seat back frame 328. The first and second extensions 420, 422 are designed to attach to the first and second side frame members 336, 338, such as, by at least partially wrapping around the side frame members, strapping to the side members, or the like, as shown in FIG. 11. The structural support structure 380 can be made from a relatively flexible and stretchable material. The structural support substrate 380 can also include a plurality of openings 424, such as, holes, slots, slits, or the like, for attaching to various seat components, inserting seat components there through, or the like. In this example, the upper end of the structural support substrate 384 includes a pair of openings 424 for attaching to the upper cross member 332, such as, the attachments for the head restraint 318.

Figure 12:
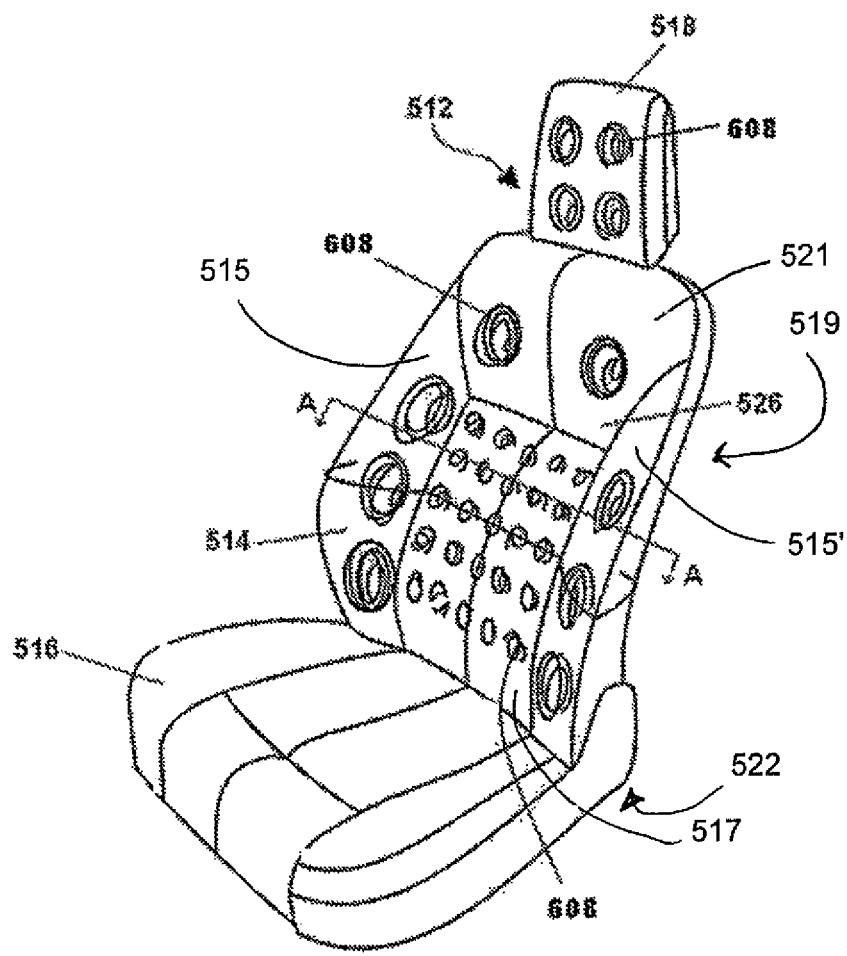
FIG. 12 is a perspective view of a cushion structure attached to a seat assembly, according to still another embodiment.
Figure 13:
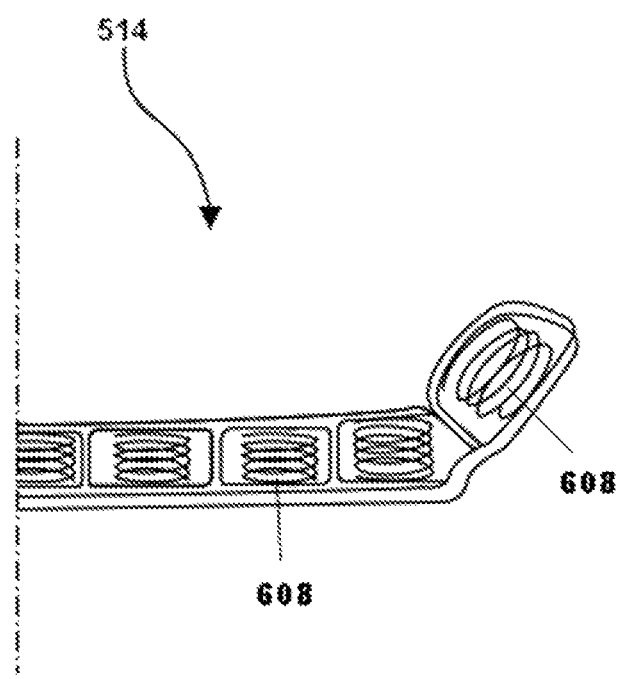
FIG. 13 is a cross sectional view of the cushion structure and seat assembly of FIG. 12 along the A-A line.
Figure 14:
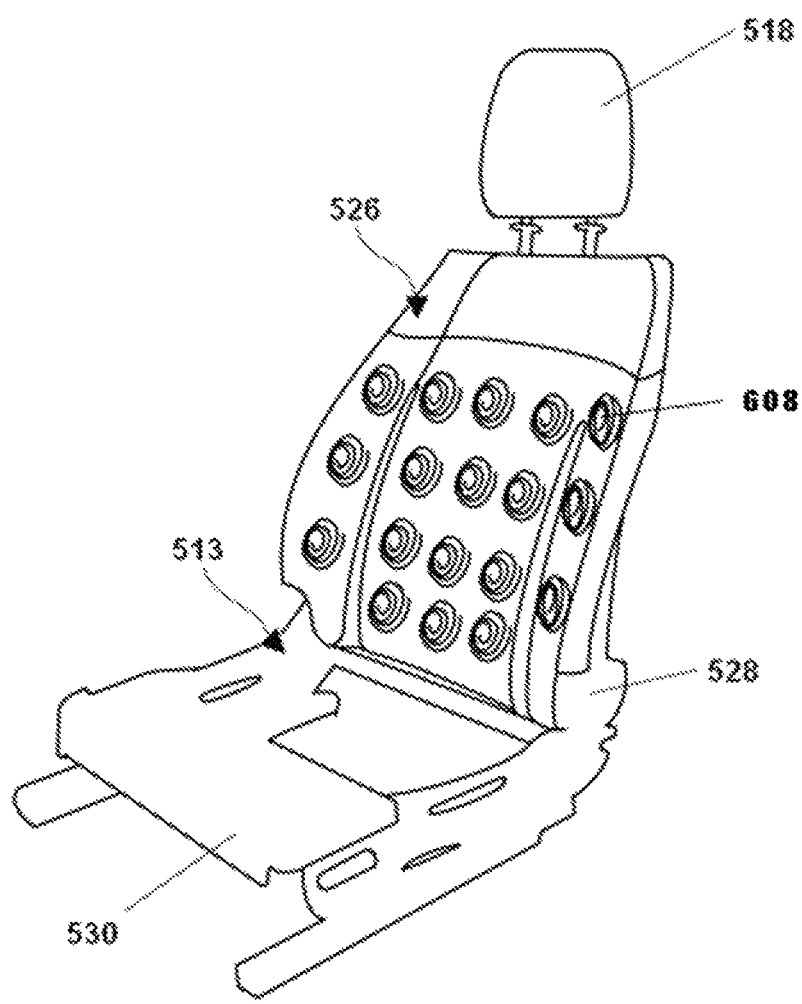
FIG. 14 is a perspective view of the cushion structure of FIG. 12 attached to a seat back frame.

Referring now to FIGS. 12-14, a seat cushion structure 526 attached to a seat assembly 512 having a seat back 514, seat base 516, and head restraint 518, according to still another embodiment is shown. In this embodiment, the structural support substrate 580 and the cushion member 582 is integrated into a single unit and coupled to the seat back sub frame 528. The cushion member 582 can include any number of compression members 608 having various characteristics, such as, size, length, spring rate/force, or the like. Groups of compression members 608 having different characteristics can be strategically positioned throughout the vehicle seat, such as, the seat back 514, seat base 516, head restraint 518, side bolsters, or the like, depending on the particular requirements. For example, a group of larger sized compression members 608 can be placed around the perimeter of the seat back 514, such as, the upper end and sides of the seat back 514. A greater number and smaller sized compression members 608 can be placed in the middle portion of the seat back 514. A fewer number and mid-sized compression members 608 can be placed in the head restraint 518. Multiple cushion members 526 and/or support structure substrates 580 can be utilized anywhere on the seat frame 513, such as the seat back frame 528, seat base frame 530, or the like. For example, cushion members 582 and compression members 608 can be positioned anywhere on the seat 12, such as, the head restraint 518, seat back 514, seat base 516, seat back side bolsters, seat base edges, or the like.

Figure 15:
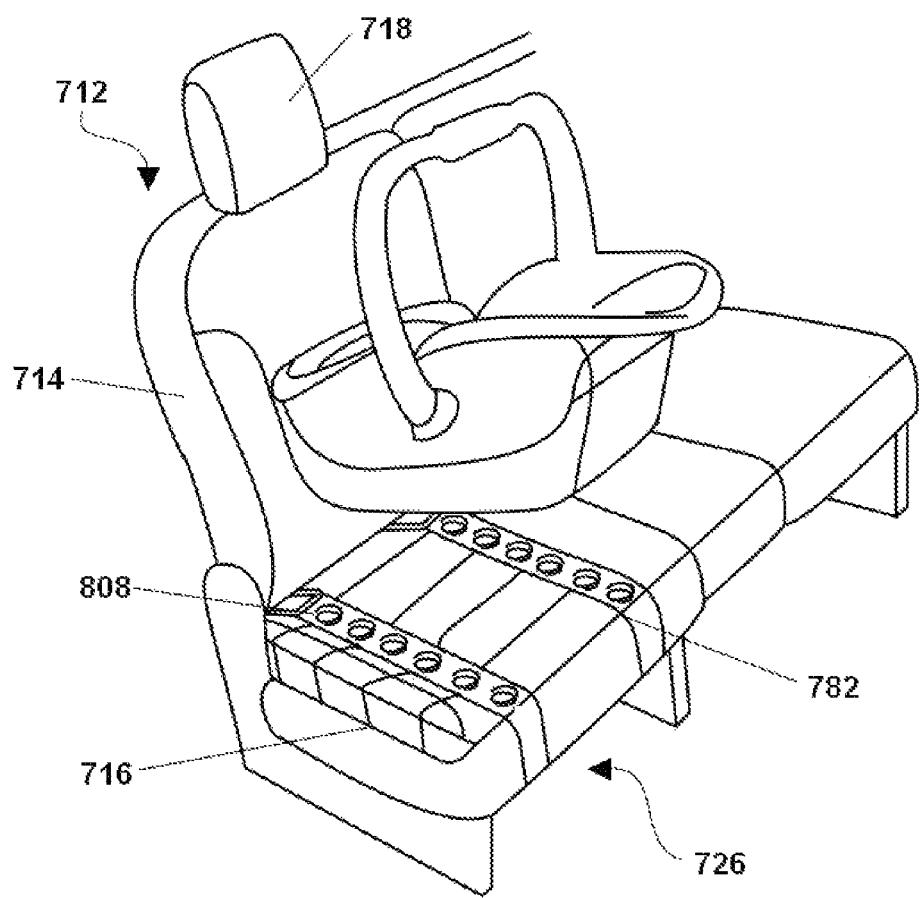
FIG. 15 is a perspective view of a cushion structure attached to a vehicle seat assembly, according to still another embodiment.
Figure 16:
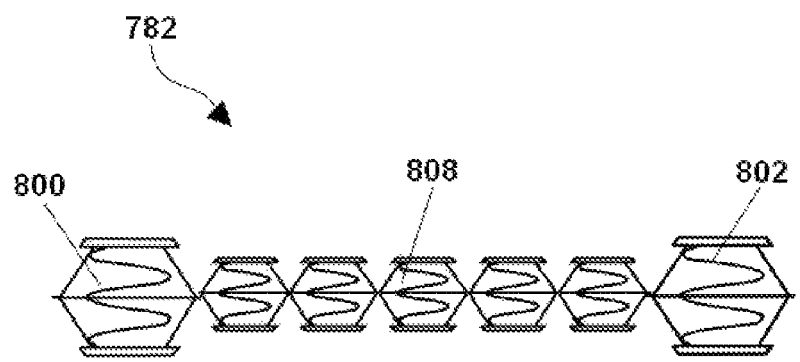
FIG. 16 is a side view of a cushion member design with compression members having different sizes and spring rates.
Figure 17:
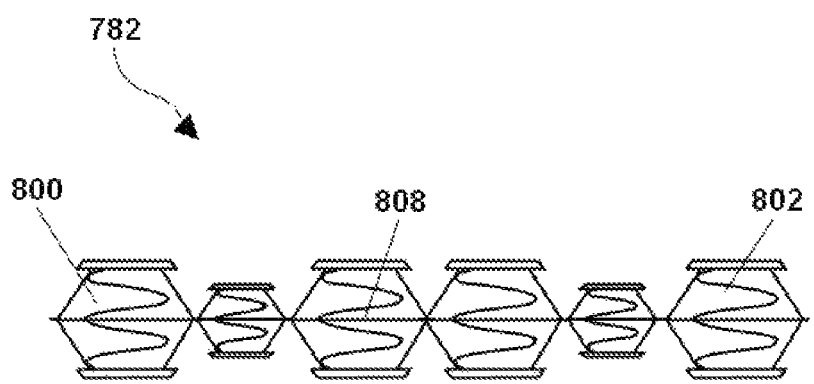
FIG. 17 is a side view of another example of a cushion member design with compression members having different sizes and spring rates.

Referring now to FIGS. 15-17, a cushion structure 726 coupled to a seat assembly 712 according to still another embodiment is shown. In this embodiment, cushion structure 726 is adapted to attach to the seat base 716 and includes a cushion member 782 and can also include a structural support substrate 780. The cushion member 782 includes a plurality of compression members 808, such as, springs, or the like. The cushion member 782 and compression members 808 can have a variety of predetermined characteristics, such as, shape, profile, layout, design pattern, or the like, depending on the performance requirements needed. Moreover, the compression members 808 can also have various predetermined attributes, such as, length, size, shape, force/rate, tension strength, location, or the like. For example, the compression members 808 can be varied in their length, force/rate, and location to create a contour on the seat base 716 such as used in an insert or a seat bolster. By designing the cushion structure 726 using intelligent, selective application of spring force/details/designs in specific areas of the seat 712 specific objectives can be accomplished. For example, the cushion structure 726 can include spring force/details/designs that are designed and contoured to accommodate a child seat, or cargo and/or personal items, such as, a purse, briefcase, boxes, or the like, as shown in FIG. 11. A relatively thin foam cushion material can also be positioned above the spring cushion to further enhance comfort and aesthetic appearance of the seat. In one example, the sides of the cushion member 800, 802 include compression members 808 that are larger than those in the middle portion of the cushion member 782 to provide support on the sides of the seat base 716, as shown in FIGS. 15 and 16. In another example, the sides of the cushion member 800, 802 and the middle portion of the cushion member 782 include compression members 808 that are larger than the other portions of the cushion member 782 to provide support on the sides and middle of the seat base 716, as shown in FIG. 17.

Figure 18:
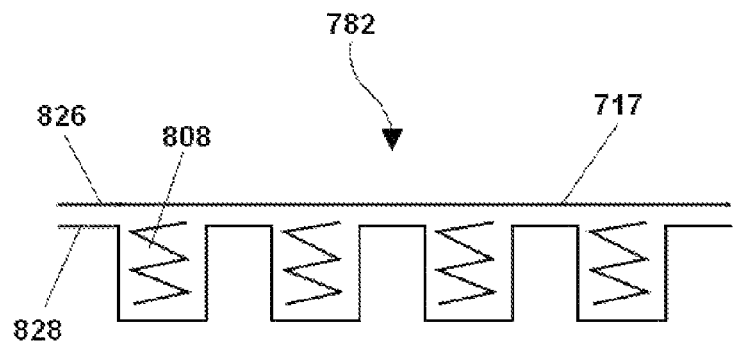
FIG. 18 is a side view of a cushion member design having a plurality of compression members in a top-weld configuration.
Figure 19:
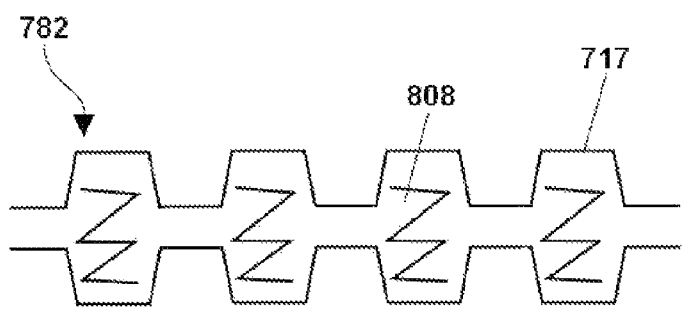
FIG. 19 is a side view of another example of a cushion member design having a plurality of compression members in a mid-weld configuration.
Figure 20:
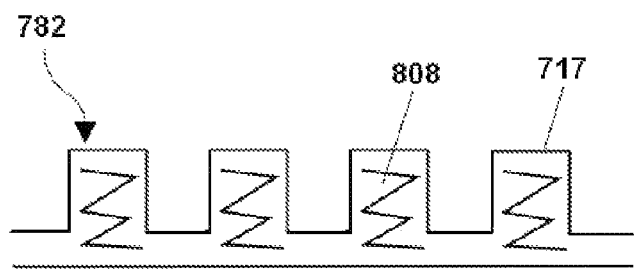
FIG. 20 is a side view of another example of a cushion member design having a plurality of compression members in a bottom-weld configuration.

Referring now to FIGS. 18-20, a cushion member 782 with compression members 808 joined together in different configurations is shown. The compression members 808 can be joined together using a variety of techniques, such as, by welding, or the like. In one example, the compression members 808 can be welded together in a top-welded configuration such that the compression members 808 extend downward from the lower surface 828 of the cushion member 782 and adjacent the flat planar seat surface 717, as shown in FIG. 18. In another example, the compression members 808 can be welded together at their middle portions in a mid-weld configuration such that the compression members 808 extend upward from the upper surface 826 of the cushion member 782 and adjacent the seat surface 717 and downward from the lower surface 828 of the cushion member 782, as shown in FIG. 19. In another example, the compression members 808 can be welded together in a bottom weld configuration such that the compression members 808 extend upward from the upper surface 826 of the cushion member and into the seat surface 717, as shown in FIG. 20.

Figure 21:
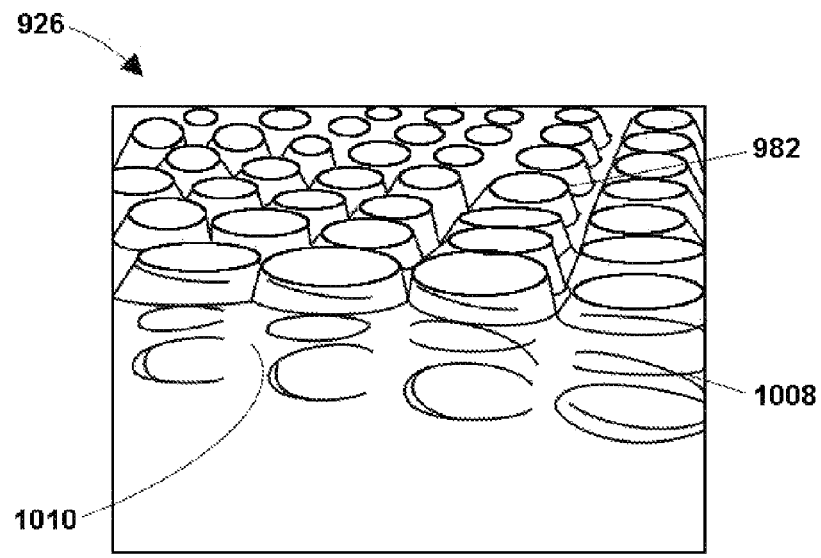
FIG. 21 is a perspective view of a cushion member having a plurality of spring members, according to still another embodiment.
Figure 22:
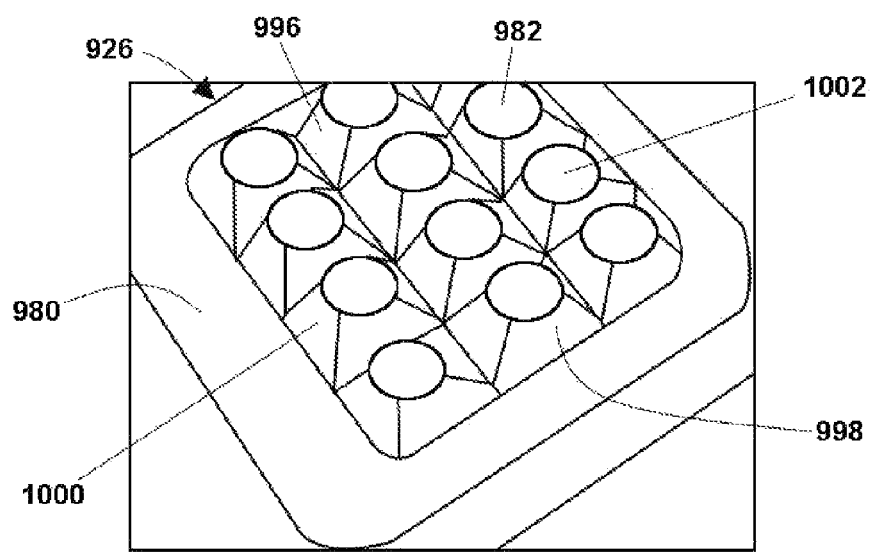
FIG. 22 is an elevated view of the cushion member of FIG. 21 encased in molded foam material.
Figure 23:
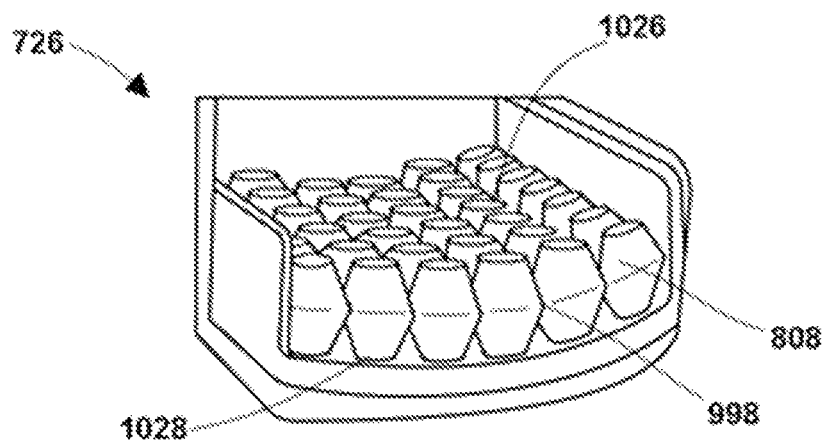
FIG. 23 is a perspective view of the cushion member of FIG. 21 encased in foam material members.

Referring now to FIGS. 21-23, a seat cushion structure 926 including a cushion member 982 having a plurality of spring members 1008 and encased in a structural support structure 980 according to still another embodiment is shown. The spring members 1008 can be arranged in a spring-on-spring arrangement and can also be housed within a segmented pouch 1010. In this embodiment, the structural support structure 980 can be made from a variety of materials, such as, foam, padding, or the like. The cushion member 982 can also be enclosed completely or partially by the support structure 980 to further enhance performance, comfort, and aesthetic appearance of the seat cushion 982. In one example, the support structure 980 surrounds the sides 996, 998, 1000, 1002 and lower surface 1028 of the cushion member 980 with the upper surface 1026 exposed, as shown in FIGS. 22 and 23.

Figure 24:
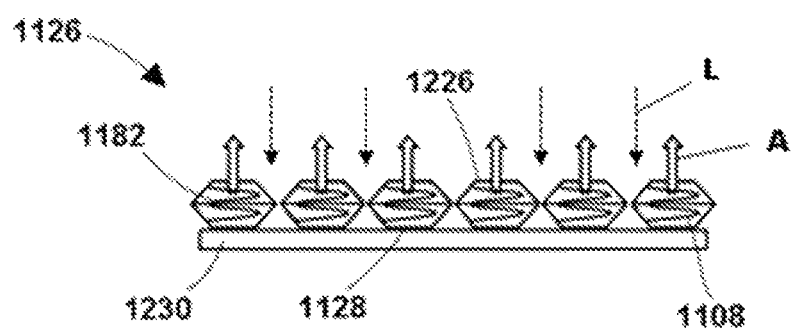
FIG. 24 is a side view of a spring-filled cushion member integrated with a ventilation pad, according to still another embodiment.
Figure 25:
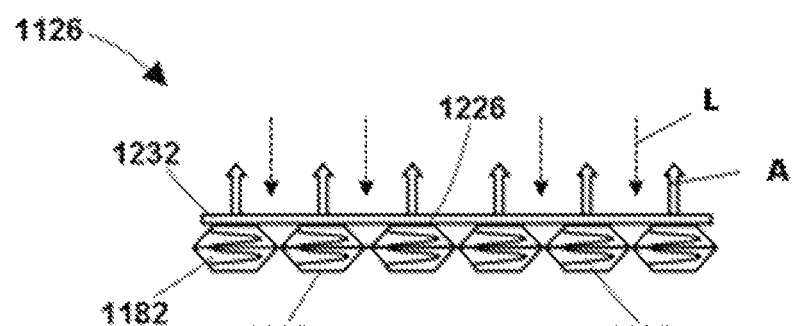
FIG. 25 is a side view of a spring-filled cushion member having a ventilated heating and cooling mat overlaid thereon, according to still another embodiment.

Referring now to FIGS. 24 and 25, a cushion structure 1126 including a climate control ventilation mat 1230 and a climate control heating/cooling mat 1232 according to still another embodiment is shown. In this embodiment, the cushion structure 1126 includes a cushion member 1182 having a plurality of compression or spring members 1108. The springs of the spring-filled cushion member 1182 can be integrated in a ventilation mat 1230 to provide airflow (A) to the seat occupant, as shown in FIG. 24. The ventilation mat 1230 is generally a planar rectangular member that can be situated adjacent the cushion member, such as, the lower surface of the cushion member 1228, or the like. The spring-filled cushion member 1182 can also have a climate controlled ventilated heating/cooling mat 1232 that is also a generally planar and rectangular member. The heating/cooling mat 1232 can be overlaid on the surface of the cushion member 1182, such as the upper surface 1226 or the like, to provide heating and cooling to the seat occupant, as shown in FIG. 25. As the occupant load (L) is applied downward to the pocket coils the trapped air within the pockets cushion the occupant. During this "cushioning effect" the air travels upward facilitating heat transfer, recirculation of air, which thereby improves occupant comfort.

Many modifications and variations of the present disclosure are possible in light of the above teachings. Therefore, within the scope of the appended claim, the present disclosure may be practiced other than as specifically described.

What is claimed is:

1. A seat cushion structure for use in a vehicle seat, the cushion structure comprising:
   a first outer wall joined to a second outer wall to form a plurality of inner walls, the outer walls and inner walls together defining a cushion member having a plurality of chambers;
   one or more compression members disposed within at least some of the plurality of chambers to absorb occupant load; and
   the cushion member further defining a first side bolster, a second opposed side bolster, a front side, an opposed rear side, an upper surface having a raised portion at the first and second side bolsters, and an opposed lower surface.

2. The seat cushion structure of claim 1, wherein each of the plurality of chambers has a predetermined shape.

3. The seat cushion structure of claim 1, further comprising an energy absorption substance disposed within the chambers.

4. The seat cushion structure of claim 1, wherein the compression members are springs.

5. The seat cushion structure of claim 4, wherein the springs have varying size.

6. A seat cushion structure for use in a vehicle seat, the cushion structure comprising:
   a first outer wall joined to a second outer wall to form a plurality of inner walls, the outer walls and inner walls together defining a cushion member having a plurality of chambers;
   one or more springs disposed within at least some of the chambers to absorb occupant load;
   a support substrate attached to the second outer wall to provide support; and
   the cushion member further defining a first side bolster, a second opposed side bolster, a front side, an opposed rear side, an upper surface having a raised portion at the first and second side bolsters, and an opposed lower surface.

7. The seat cushion structure of claim 6, wherein the springs have varying size.

8. A seat base cushion structure for use in a vehicle seat, the cushion structure comprising:
   a cushion member having a first outer wall joined to a second outer wall to form a plurality of inner walls, the outer walls and inner walls together defining a plurality of chambers, the cushion member further defining a first side bolster, a second opposed side bolster, a front side, an opposed rear side, an upper surface having a raised portion at the first and second side bolsters, and an opposed lower surface;
   a first set of springs disposed within at least some of the chambers to absorb occupant load, wherein the first set of springs is arranged in a first row from the cushion member front side to the cushion member rear side; and
   a second set of springs disposed within at least some of the chambers to absorb occupant load, wherein the second set of springs is arranged in a second row from the cushion member front side to the cushion member rear side, wherein the first and second set of springs serve to straddle and support occupants.

9. The seat base cushion structure of claim 8 further comprising a structural support substrate adjacent the cushion member, wherein the first set of springs or second set of springs is secured to the structural support, such that either the first set of springs or second set of springs absorb energy from an impact collision.

10. The seat base cushion structure of claim 8 further comprising a structural support substrate that at least partially encloses the cushion member.

* * * * *